(12) United States Patent
Yoshimatsu

(10) Patent No.: US 9,841,788 B2
(45) Date of Patent: Dec. 12, 2017

(54) OPERATION DEVICE

(71) Applicant: FUJITSU COMPONENT LIMITED, Tokyo (JP)

(72) Inventor: Kazuya Yoshimatsu, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 227 days.

(21) Appl. No.: 14/854,506

(22) Filed: Sep. 15, 2015

(65) Prior Publication Data

US 2016/0211091 A1      Jul. 21, 2016

(30) Foreign Application Priority Data

Jan. 16, 2015   (JP) .................................. 2015-006886

(51) Int. Cl.
*H01H 19/64*      (2006.01)
*G06F 1/16*      (2006.01)

(52) U.S. Cl.
CPC .......... *G06F 1/1662* (2013.01); *G06F 1/1664* (2013.01)

(58) Field of Classification Search
CPC .................................................. G06F 1/1662
USPC ......................................................... 307/113
See application file for complete search history.

(56) References Cited

U.S. PATENT DOCUMENTS

| 6,415,707 B1* | 7/2002 | Armstrong .............. A63F 13/06 99/280 |
| 2007/0200734 A1* | 8/2007 | Lee ....................... G06F 1/1626 341/22 |
| 2010/0228111 A1* | 9/2010 | Friman .............. A61B 5/14532 600/365 |
| 2011/0128207 A1* | 6/2011 | Arimura .......... G06K 19/07743 343/906 |

FOREIGN PATENT DOCUMENTS

| JP | 5-94057 | 4/1993 |
| JP | 10-223090 | 8/1998 |
| JP | 10-269002 | 10/1998 |

OTHER PUBLICATIONS

Patent Abstracts of Japan, Publication No. 10-223090, published Aug. 21, 1998.
Patent Abstracts of Japan, Publication No. 10-269002, published Oct. 9, 1998.
Patent Abstracts of Japan, Publication No. 5-94057, published Apr. 16, 1993.

\* cited by examiner

*Primary Examiner* — Jared Fureman
*Assistant Examiner* — Duc M Pham
(74) *Attorney, Agent, or Firm* — Staas & Halsey LLP

(57) ABSTRACT

An operation device includes: a first substrate on which a wiring pattern is formed; an input unit that is mountable on the first substrate, and includes a member to be operated, a first wireless communication module that outputs a signal in accordance with operation of the member to be operated, (Continued)

and a first terminal that contacts the wiring pattern and supplies a power source to the first wireless communication module; and a position defining member that defines a position of the input unit on the first substrate.

9 Claims, 7 Drawing Sheets

| ADDRESS | TYPE OF INPUT UNIT |
|---|---|
| 00:00:00:00:00:00 | SWITCH UNIT 20-1 |
| 00:00:00:00:00:01 | SWITCH UNIT 20-2 |
| 00:00:00:00:00:02 | SWITCH UNIT 20-3 |
| 00:00:00:00:00:03 | SWITCH UNIT 20-4 |
| 00:00:00:00:00:04 | SWITCH UNIT 20-5 |
| 00:00:00:00:00:05 | SWITCH UNIT 20-6 |
| 00:00:00:00:01:00 | SWITCH UNIT 40-1 |
| 00:00:00:00:02:00 | SWITCH UNIT 40-2 |
| 00:00:00:00:03:00 | SWITCH UNIT 40-3 |
| 00:00:00:01:00:00 | ROTARY ENCODER UNIT 50-1 |
| 00:00:00:02:00:00 | ROTARY ENCODER UNIT 50-2 |
| 00:00:01:00:00:00 | SLIDE RESISTOR UNIT 60 |

OPERATION DEVICE

CROSS-REFERENCE TO RELATED APPLICATION

This application is based upon and claims the benefit of priority of the prior Japanese Patent Application No. 2015-006886 filed on Jan. 16, 2015, the entire contents of which are incorporated herein by reference.

FIELD

A certain aspect of the embodiments is related to an operation device.

BACKGROUND

There is known an operation device on which an input unit, such as a switch unit and an encoder unit, is provided. A user operates such the input unit, so that a signal is inputted to the operation device.

For example, Patent Document 1 (i.e., Japanese Laid-open Patent Publication No. 10-223090) discloses an operation device including; a plurality of switch units each including a switch; and a plurality of operation buttons each of which projects a pressing pin which turns on/off the switch. Patent Document 2 (i.e., Japanese Laid-open Patent Publication No. 10-269002) discloses a button operation device like the operation device of the Patent Document 1. Patent Document 3 (i.e., Japanese Laid-open Patent Publication No. 5-94057) discloses an operation device including; a plurality of units each of which has a plurality of operation displaying elements; and a plurality of attachment portions. In the operation device, each unit can be attached to an arbitrary position in the attachment portions. In the operation devices of the Patent Documents 1 to 3, the positions of the operation buttons or the units can be changed depending on the preference of the user.

SUMMARY

According to an aspect of the present invention, there is provided an operation device including: a first substrate on which a wiring pattern is formed; an input unit that is mountable on the first substrate, and includes a member to be operated, a first wireless communication module that outputs a signal in accordance with operation of the member to be operated, and a first terminal that contacts the wiring pattern and supplies a power source to the first wireless communication module; and a position defining member that defines a position of the input unit on the first substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the operation devices of the Patent Documents 1 and 2, the positions of the switch units are fixed, and each of the operation buttons needs to be arranged above any one of the switch units. That is, in the Patent Documents 1 and 2, the position of each of the operation buttons can be changed, but the position of each of the operation buttons has to be selected from a plurality of predetermined positions (i.e., a plurality of positions at which the switch units are provided). In the operation device of the Patent Document 3, the attachment portions are provided on a main body of the operation device, and therefore the position of each of the units can be changed. However, the position of each of the units has to be selected from a plurality of predetermined positions (i.e., a plurality of positions at which the attachment portions are provided). Therefore, in the operation devices of the Patent Documents 1 to 3, the degree of freedom of the arrangement of the operation buttons or the units is limited.

A description will now be given of an embodiment of the present invention with reference to the drawings.

An operation device 100 according to the present embodiment is an electronic device for operating a game device, medical instruments, and so on, for example. An operational object by the operation device is not limited to the above-mentioned devices.

Figure 1:
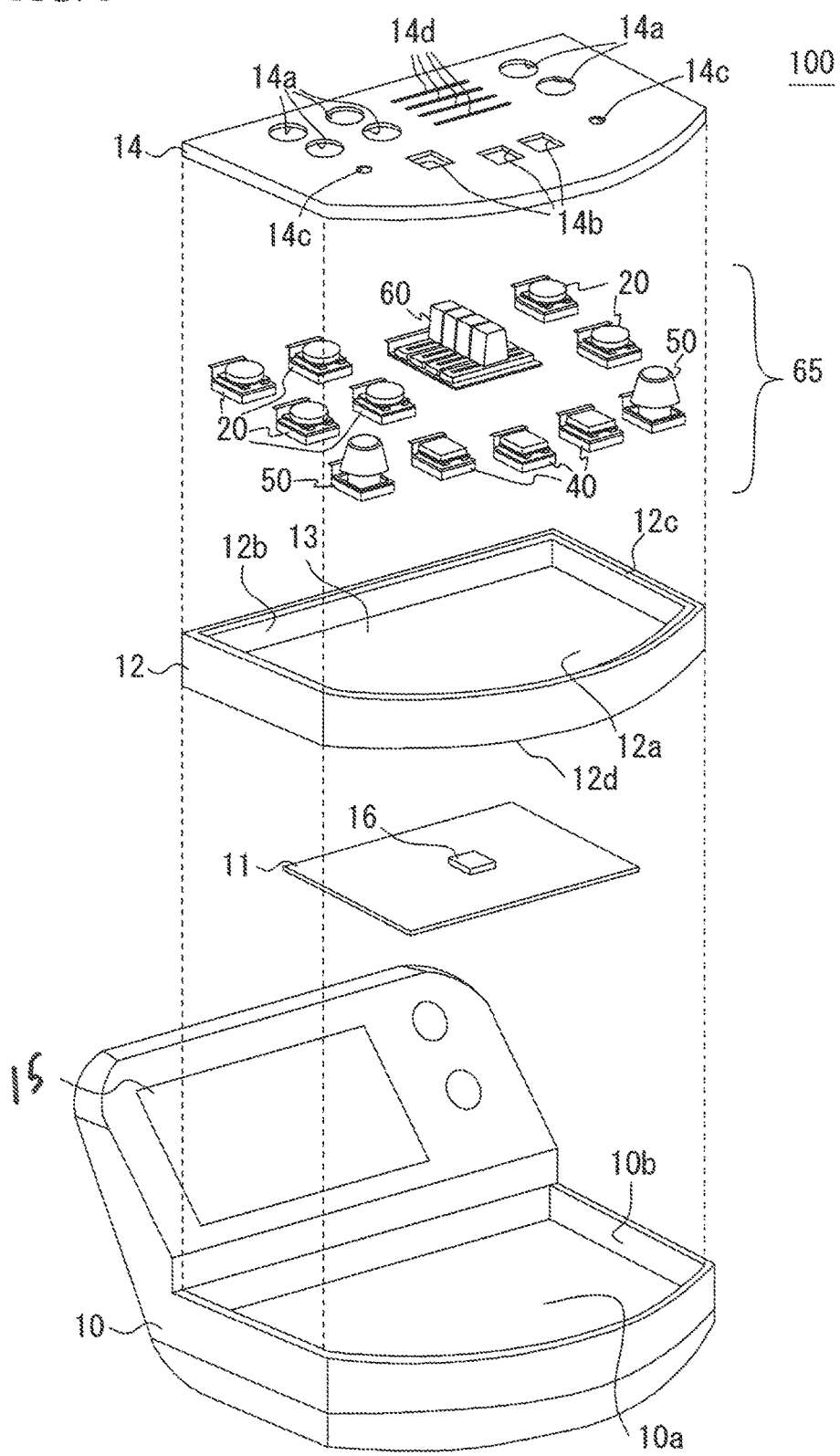
FIG. 1 is an exploded perspective view of an operation device.
Figure 2A:
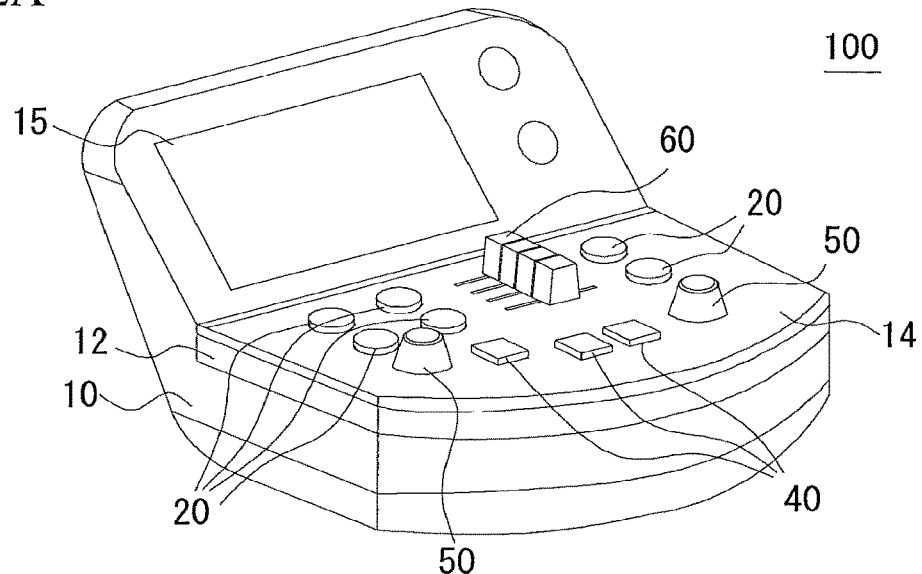
FIGS. 2A and 2B are perspective views illustrating the operation device.
Figure 2B:
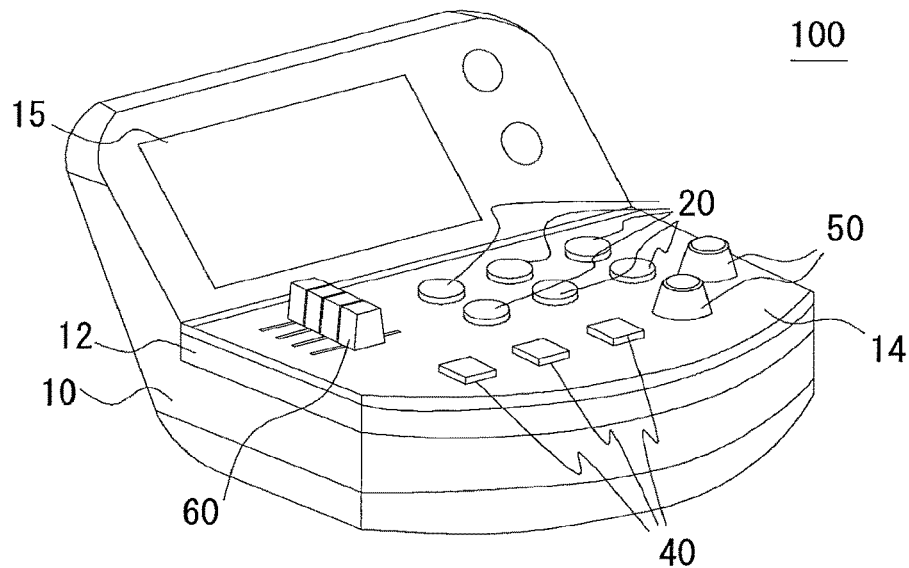
Figure 2C:
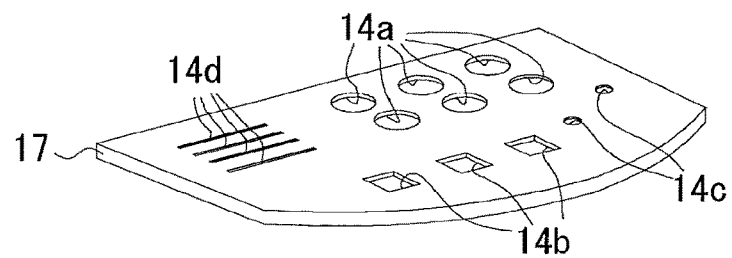
FIG. 2C is a perspective view illustrating an example of a plate.

FIG. 1 is an exploded perspective view of the operation device 100. FIGS. 2A and 2B are perspective views illustrating the operation device 100. FIG. 2C is a perspective view illustrating an example of a plate 17.

As illustrated in FIG. 1, the operation device 100 includes a main body 10, substrates 11 and 13, a cover 12, and a plate 14.

A concave portion 10a is provided on the main body 10. Also, the main body 10 includes a display unit 15 such as a liquid crystal display, for example, and further includes therein a CPU 70, a memory 71, and so on (see FIG. 6A).

The substrate 11 is arranged on a bottom surface of the concave portion 10a of the main body 10. A wireless communication module 16 is mounted on the substrate 11. The wireless communication module 16 is electrically connected to the above-mentioned processor (i.e., the CPU 70), transmits and receives a signal to/from the processor. Moreover, the wireless communication module 16 may be mounted on a rear surface (i.e., a surface opposite to the concave portion 10a) of the substrate 13. When the wireless communication module 16 is mounted on the substrate 13, the operation device 100 does not need to include the substrate 11.

The cover 12 is arranged on a frame 10*b* of the main body 10 so as to cover the concave portion 10*a* of the main body 10 and the substrate 11. The cover 12 is fixed on the frame 10*b* of the main body 10 by adhesion, press-fit or a screw fastener. The cover 12 includes a bottom portion 12*d*, and a wall portion 12*b* formed on an outer circumference of the bottom portion 12*d*. A concave portion 12*a* is provided in the center of the cover 12. The substrate 13 is arranged on the bottom portion 12*d*. A cutout portion 12*c* in which the plate 14 is fitted is formed on an upper end of the wall portion 12*b*.

Figure 3A:
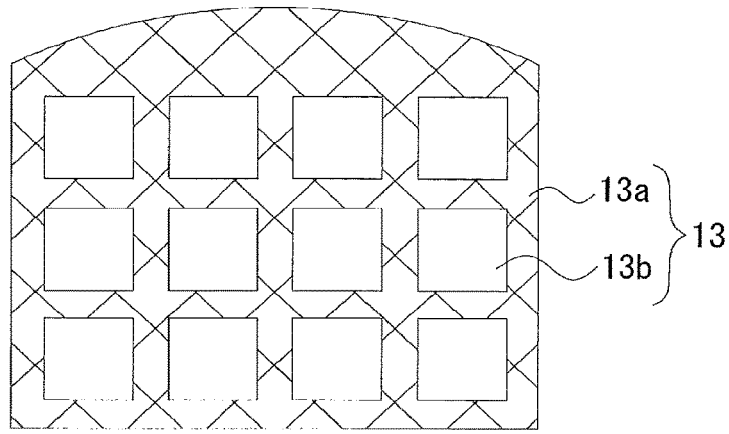
FIGS. 3A to 3C are plain views illustrating a substrate.
Figure 3B:
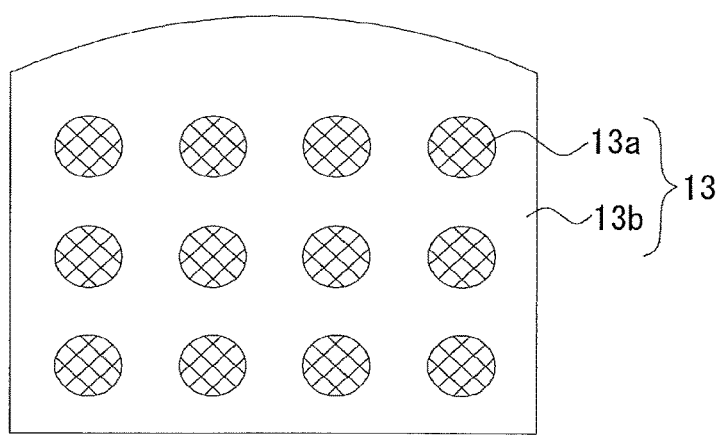
Figure 3C:
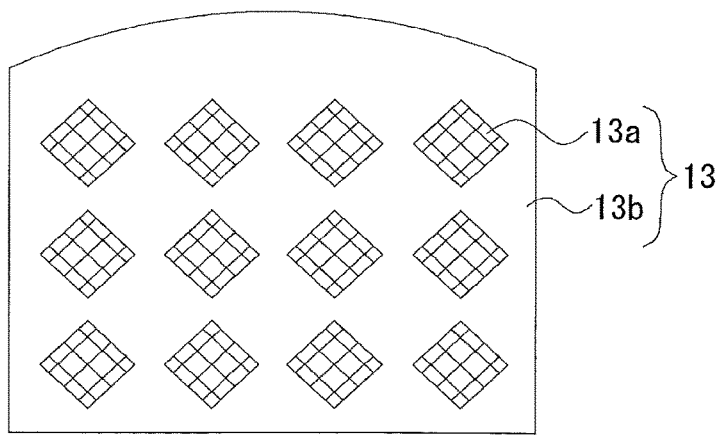

FIGS. 3A to 3C are plain views illustrating the substrate 13. As illustrated in FIG. 3A, a wiring pattern 13*a* (i.e., a hatching area) and insulation portions 13*b* are provided on the whole upper surface of substrate 13. The wiring pattern 13*a* is a lattice-shaped pattern made of a metal such as copper, for example. A power source (i.e., an electric power) is supplied from the main body 10 to the wiring pattern 13*a*. The shape of the wiring pattern 13*a* may be a circle as illustrated in FIG. 3B, a quadrate as illustrated in FIG. 3C, or a shape other than the shapes illustrated in FIGS. 3A to 3C. It is desirable that the wiring patterns 13*a* having the circle shape or quadrate shape are arranged at equal intervals on the whole upper surface of substrate 13. However, the arrangement of the wiring patterns 13*a* is not limited to these examples.

Returning to FIG. 1, a plurality of input units 65 are arranged on the substrate 13. Here, the operation device 100 needs to include at least one input unit 65. The input unit 65 is a switch unit 20 or 40, a rotary encoder unit 50, or a slide resistor unit 60, for example. The input unit 65 is arranged in the operation device 100 so as to be sandwiched between the plate 14 and the substrate 13. The plate 14 is fitted in the cutout portion 12*c* of the wall portion 12*b*. Also, the plate 14 may be fixed to the cutout portion 12*c* of the wall portion 12*b* by the press-fit or the screw fastener. On the plate 14, opening portions 14*a* to 14*d* (i.e., holes 14*a*, 14*b* and 14*c*, and a slit 14*d*) are formed. The input unit 65 is inserted into such the opening portions 14*a* to 14*d*, and hence the position of the input unit 65 is fixed. Thus, the plate 14 has a function of positioning of the input unit 65.

The substrate 11 is mounted on the concave portion 10*a* of the main body 10, the cover 12 is fixed on the frame 10*b* of the main body 10, the input unit 65 is arranged on the substrate 13, and the plate 14 is fitted in the cutout portion 12*c* of the wall portion 12*b*. Thereby, the operation device 100 as illustrated in FIG. 2A is formed. As illustrated in FIG. 2A, a part of the switch unit 20 (e.g. a key top) is exposed from the hole 14*a*, and a part of the switch unit 40 (e.g. a key top) is exposed from the hole 14*b*. A part of the rotary encoder unit 50 (e.g. a rotatable knob) is exposed from the hole 14*c*, and a part of the slide resistor unit 60 (e.g. a key which is slidable to right and left) is exposed from the slit 14*d*. A user operates these input units 65, so that the user can input operation signals to the CPU 70 of the operation device 100 (see FIG. 6A).

Moreover, in the operation device 100, the positions of the input units 65 on the substrate 13 can be changed as illustrated in FIG. 2B. The positions of the input units 65 are decided by the holes 14*a*, 14*b* and 14*c* and the slit 14*d* of the plate 14. Therefore, by replacing the plate 14 of FIGS. 1 and 2A with another plate 14 in which the positions of the holes 14*a*, 14*b* and 14*c* and the slit 14*d* are different from those of FIGS. 1 and 2A, as illustrated in FIG. 2C, the positions of the input units 65 can be changed.

Thus, the plate to be mounted on the operation device 100 can be appropriately replaced depending on a requested key arrangement.

Figure 4A:
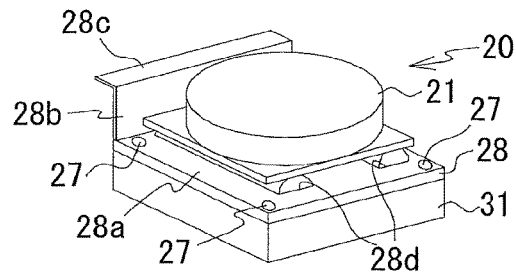
FIG. 4A is a perspective view of a switch unit.

Next, a description will be given of the input unit 65. FIG. 4A is a perspective view of the switch unit 20, and FIG. 4B is a side view of the switch unit 20.

Figure 4B:
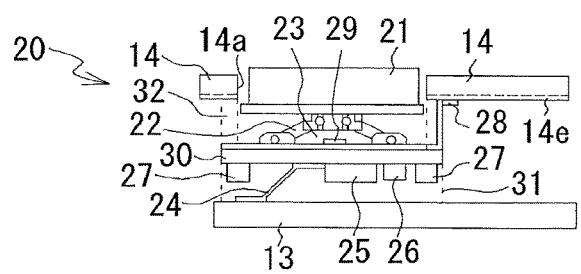
FIG. 4B is a side view of the switch unit.

As illustrated in FIGS. 4A and 4B, the switch unit 20 includes a disk-like key top 21, a substrate 30 and a housing 31. Moreover, gear links 22, a switch 23, and a LED (Light Emitting Diode) 29 are provided on an upper surface of the substrate 30, as illustrated in FIG. 4B. Moreover, in the switch unit 20, a terminal 28 is provided on the upper surface of the substrate 30. The terminal 28 is made of a conductive material, and is bent into a crank shape, as illustrated FIG. 4B. A bottom portion 28*a* of the terminal 28 is a flat plate shape, has opening portions 28*d* for the gear links 22, and is fixed to the substrate 30 and the housing 31 with screws 27. A vertical portion 28*b* of the terminal 28 is extended vertically upward from a side of the bottom portion 28*a*. A contact portion 28*c* is extended horizontally outward from an upper end of the vertical portion 28*b*, and contacts a conductor layer 14*e* provided on a lower surface of the plate 14.

A plate-like spring 24, an IC (Integrated Circuit) 25, and a wireless communication module 26 are provided on a lower surface of the substrate 30.

The housing 31 is provided to surround the lower surface of the substrate 30, contacts the substrate 13, and supports the switch unit 20. On the other hand, provided in an upper part of the switch unit 20 is a housing 32 which is formed on the bottom portion 28*a* of the terminal 28 so as to surround the key top 21 and the gear links 22. The housing 32 supports the plate 14. Here, in FIG. 4B, the housings 31 and 32 are indicated by dashed lines. On the other hand, in FIG. 4A, the housing 32 is omitted in order to indicate opening portions 28*d* for the gear links 22, and the screws 27. Similarly, also in FIGS. 4C, 4E and 5A described later, the housing 32 is omitted.

The key top 21 is provided on the substrate 30 via the gear links 22, and is exposed from the hole 14*a* of the plate 14, as illustrated in FIG. 4B.

The key top 21 is made of an insulator such as a resin, for example. Moreover, the whole or a part of the key top 21 may be made of a transparent material penetrating a light from the LED 29. The housings 31 and 32 are made of the insulator such as the resin.

The conductor layer 14*e* is provided on the lower surface of the plate 14. The conductor layer 14*e* is made of a deposited metal such as aluminum, or a coated conductive material, or the like, for example. The terminal 28 is made of a metal (alloy, aluminum, or the like), and contacts the conductor layer 14*e*. The contact portion 28*c* of the terminal 28 electrically contacts the conductor layer 14*e*, so that the contact portion 28*c* supplies a ground potential to the IC 25 and the wireless communication module 26.

The spring 24 is a plate spring made of a conductor such as a metal, for example. One end of the spring 24 contacts the wiring pattern 13*a* of the substrate 13, and the other end of the spring 24 is fixed to the substrate 30. Since the one end of the spring 24 which contacts the wiring pattern 13*a* is not fixed to the substrate 13, it is possible to move the switch unit 20 on the substrate 13. The spring 24 is electrically connected to the wiring pattern 13*a* of the substrate 13, and functions as a terminal supplying a power source (i.e., an electric power) from the substrate 13 to the IC 25 and the wireless communication module 26.

The gear links 22 support the key top 21, one ends of the gear links 22 are coupled with the key top 21, and the other ends of the gear links 22 are coupled with the substrate 30. When the user depresses the key top 21, the switch 23 is depressed by the key top 21, and the switch 23 is turned on. At this time, the IC 25 detects that the switch 23 is turned on, and the wireless communication module 26 outputs a wireless signal to the wireless communication module 16 on the substrate 11 in accordance with the detection by the IC 25. The operation device 100 operates in accordance with the signal received by the wireless communication module 16.

Moreover, the wireless communication module 16 of the main body 10 outputs a lighting signal of the LED 29 to the wireless communication module 26 in accordance with the input of the signal from the switch unit 20. The IC 25 turns on the LED 29 in accordance with the lighting signal received by the wireless communication module 26. Since the light of the LED 29 is blocked by the housing 32, the light of the LED 29 is hard to leak out to the horizontal direction of the switch unit 20 and is radiated upward. The user can confirm existence or nonexistence of the operation of the switch unit 20 and/or the operation content of the switch unit 20 by viewing the light of the LED 29. Here, a lighting member other than the LED 29 may be provided on the switch unit 20.

Figure 4C:
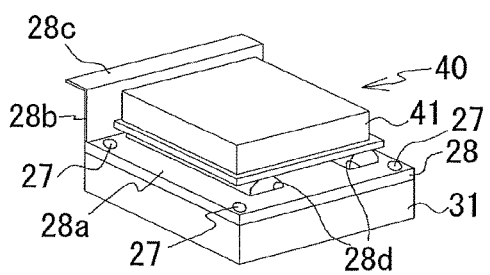
FIG. 4C is a perspective view of a switch unit.

FIG. 4C is a perspective view of the switch unit 40. FIG. 4D is a side view of the switch unit 40. The switch unit 40 includes a hexahedral key top 41 instead of the key top 21. The key top 41 is made of an insulator such as the resin, for example. Moreover, the whole or a part of the key top 41 may be made of a transparent material penetrating the light from the LED 29, for example. As illustrated in FIG. 4D, the key top 41 is exposed from the hole 14*b* of the plate 14. Other configurations of the switch unit 40 are the same as those of the switch unit 20.

Figure 4E:
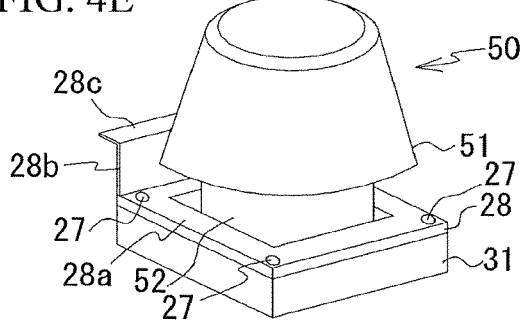
FIG. 4E is a perspective view of a rotary encoder unit.
Figure 4D:
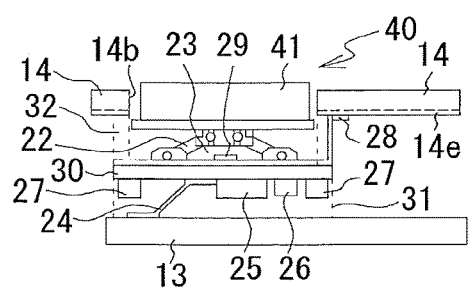
FIG. 4D is a side view of the switch unit.
Figure 4F:
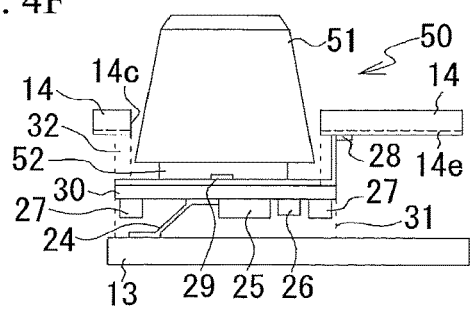
FIG. 4F is a side view of the rotary encoder unit.

FIG. 4E is a perspective view of the rotary encoder unit 50. FIG. 4F is a side view of the rotary encoder unit 50. The rotary encoder unit 50 includes a knob 51 and a column 52 instead of the key top 21 and the gear links 22. The knob 51 is made of an insulator such as the resin, for example. Moreover, the whole or a part of the knob 51 may be made of a transparent material penetrating the light from the LED 29, for example. The column 52 is provided on the upper surface of the substrate 30, and supports the knob 51. As illustrated in FIG. 4F, the knob 51 is exposed from the hole 14*c* of the plate 14, and hence the user can rotate the knob 51. Other configurations of the rotary encoder unit 50 are the same as those of the switch unit 20.

The IC 25 of the rotary encoder unit 50 detects a rotational quantity of the knob 51, and outputs a signal corresponding to the rotational quantity of the knob 51 to the wireless communication module 16 on the substrate 11 by using the wireless communication module 26. Thereby, the operation device 100 operates in accordance with the operation of the rotary encoder unit 50. Also, the wireless communication module 26 receives the lighting signal corresponding to the rotational quantity of the knob 51 outputted from the wireless communication module 16, and the IC 25 turns on the LED 29. For example, the IC 25 can blink the LED 29 and change a light emission color, a light emission quantity or blinking intervals of the LED 29, in accordance with the received lighting signal.

Figure 5A:
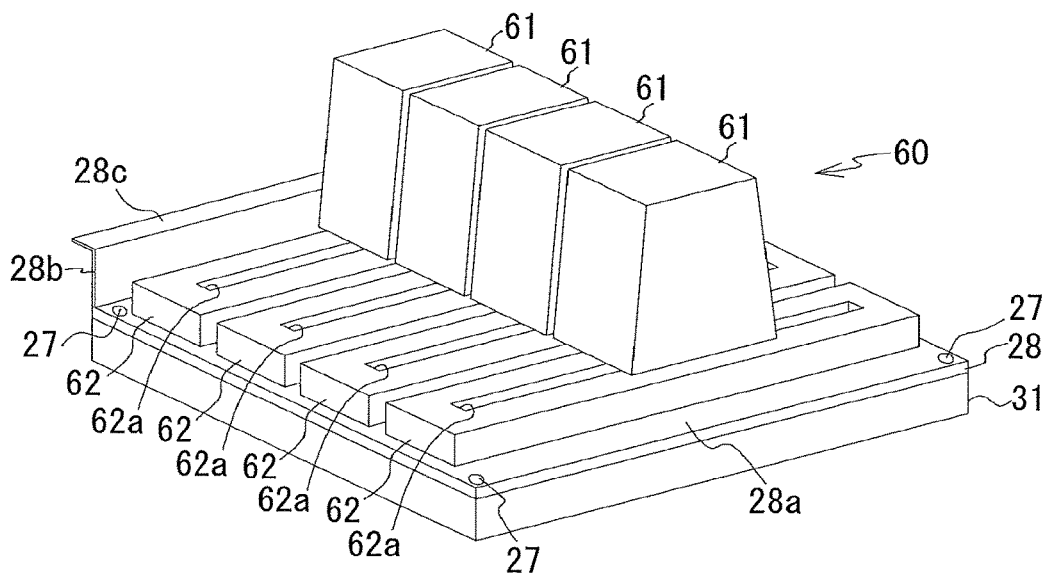
FIG. 5A is a perspective view of a slide resistor unit.
Figure 5B:
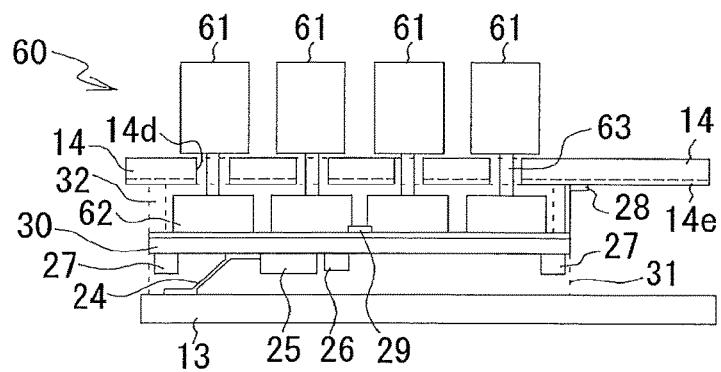
FIG. 5B is a side view of the slide resistor unit.

FIG. 5A is a perspective view of the slide resistor unit 60. FIG. 5B is a side view of the slide resistor unit 60. The slide resistor unit 60 includes keys 61, bases 62 and columns 63 instead of the key top 21 and the gear links 22. The keys 61 are made of an insulator such as the resin, for example. Moreover, the whole or parts of the keys 61 may be made of a transparent material penetrating the light from the LED 29, for example. Other configurations of the slide resistor unit 60 are the same as those of the switch unit 20.

Four bases 62 are provided on the upper surface of the substrate 30. The column 63 is provided on each base 62, and the key 61 is supported on the column 63. The column 63 passes through a slit 14*d* of the plate 14, and the key 61 is exposed above the plate 14. The user slides the key 61 along a slit 62*a* of the base 62.

The IC 25 of the slide resistor unit 60 detects that the user slides the key 61. The wireless communication module 26 outputs a signal corresponding to a slide quantity of the key 61 to the wireless communication module 16 on the substrate 11. The operation device 100 operates in accordance with the operation of the slide resistor unit 60. Also, the wireless communication module 26 receives the lighting signal corresponding to the slide quantity of the key 61 transmitted from the wireless communication module 16, and the IC 25 turns on the LED 29. For example, the IC 25 can blink the LED 29 and change the light emission color, the light emission quantity or the blinking intervals of the LED 29, in accordance with the received lighting signal.

Figures 6A, 6B:
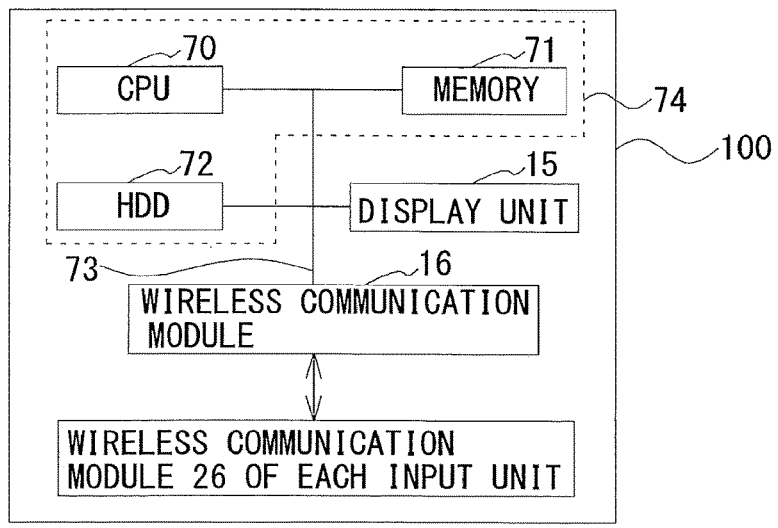
FIG. 6A is a block diagram illustrating the configuration of the operation device.
FIG. 6B is a diagram illustrating a data table stored into a HDD.

FIG. 6A is a block diagram illustrating the configuration of the operation device 100. As illustrated in FIG. 6A, the operation device 100 includes the display unit 15, the wireless communication modules 16 and 26, and further has the CPU (Central Processing Unit) 70, the memory 71 and a HDD (Hard Disc Drive) 72 included in the main body 10. The CPU 70, the memory 71, the HDD 72, the display unit 15 and the wireless communication module 16 are connected with a system bus 73. The CPU 70, the memory 71 and the HDD 72 function as a control device 74.

The CPU 70 controls the operation of the whole operation device 100. The memory 71 functions as a working space. The wireless communication module 16 performs wireless communication with the wireless communication module 26 of each input unit by using a communication system such as Bluetooth. The wireless communication module 16 functions as a master, and the wireless communication module 26 functions as a slave. The HDD 72 stores given programs, data and so on, and further a data table illustrated in FIG. 6B.

As illustrated in FIG. 6B, the addresses of the input units 65 and the types of the input units 65 are associated with each other and stored into the data table. Each of the addresses is information for identifying a single input unit 65 from among the plurality of input units 65, and is used for the communication between the wireless communication modules 16 and 26. Here, in FIG. 6B, numbers, such as "20-1" and "20-2", are given to the switch units 20, respectively. Numbers are also given to the switch units 40 and the rotary encoder units 50 in a similar way, respectively.

Figure 7:
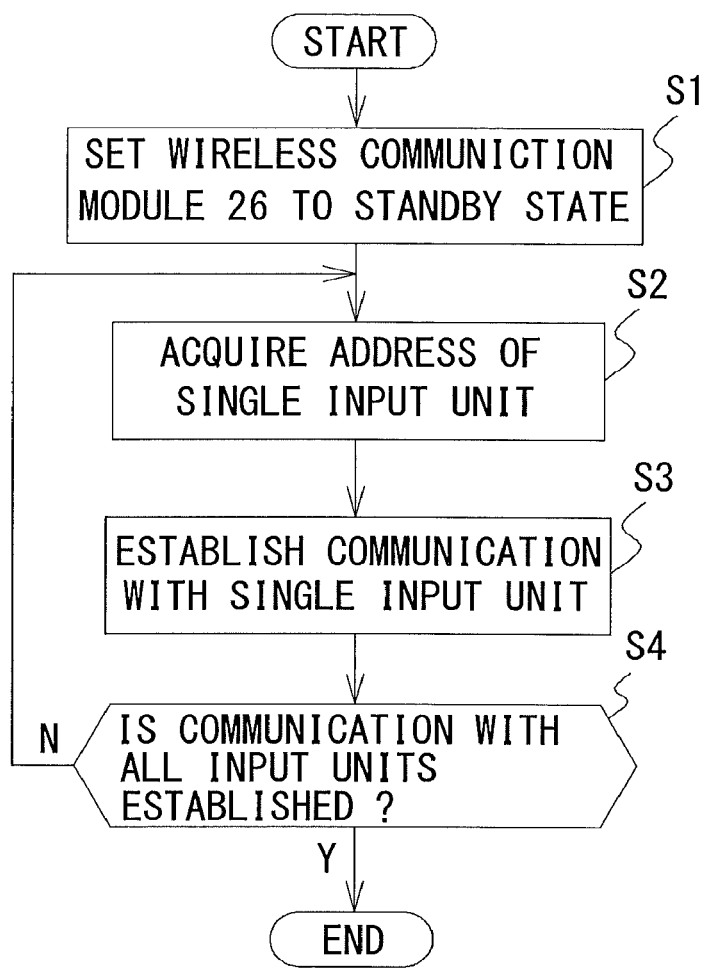
FIG. 7 is a flowchart illustrating a process to be performed by a CPU.

FIG. 7 is a flowchart illustrating a process to be performed by the CPU 70. The process of FIG. 7 is a process for the pairing of the main body 10 and each input unit 65 (i.e., establishment of the communication), and is performed when the operation device 100 is turned on, for example.

In step S1, the CPU 70 sets the wireless communication module 26 of each input unit 65 to a standby state.

Next, in step S2, the CPU 70 acquires an address of a single input unit 65 among the plurality of input units 65, from the data table stored into the HDD 72.

Next, in step S3, the CPU 70 establishes communication with the input unit 65 corresponding to the acquired address. Specifically, established are the communication between the wireless communication module 16 and the wireless communication module 26 of the input unit 65 corresponding to the acquired address.

Then, in step S4, the CPU 70 judges whether the communication with all input units 65 is established. When the communication with all input units 65 is not established (NO in step S4), the procedure of the CPU 70 returns to step S2. When the communication with all input units 65 is established (YES in step S4), the CPU 70 finishes the process of FIG. 7.

Thus, when the operation device 100 is turned on, the communication between each input unit 65 and the main body 10 is established. Therefore, even if the arrangement of each input unit 65 is changed, the communication between each input unit 65 and the main body 10 is established when the operation device 100 is turned on after the change of the arrangement. Accordingly, it is possible to operate the operation device 100 by using each input unit 65 mounted on the operation device 100.

As described above, according to the present embodiment, the operation device 100 includes: the substrate 13 on which the wiring pattern 13a is formed; the input unit 65 that is mountable on the substrate 13, and includes a member to be operated, the wireless communication module 26 that outputs a signal in accordance with operation of the member to be operated, and the spring 24 that contacts the wiring pattern 13a, and supplies the power source (i.e., an electric power) to the wireless communication module 26; and the plate 14 that defines a position of the input unit on the substrate 13. Even when the arrangement of the input unit 65 is changed, the power source is supplied from the substrate 13 to the input unit 65 via the spring 24, and hence the operation device 100 can be operated by using the input unit 65. The arrangement of the input unit 65 can be freely changed on the substrate 13. For this reason, the user can change the arrangement of the input unit 65 to easy-to-use arrangement according to user's preference.

According to the present embodiment, the input unit 65 is provided between the substrate 13 and the plate 14. Therefore, the position of the input unit 65 is defined between the substrate 13 and the plate 14.

According to the present embodiment, the operation device 100 includes the cover 12. The cover 12 includes: the bottom portion 12d on which the substrate 13 is mounted; the wall portion 12b formed on an outer circumference of the bottom portion 12d; and the cutout portion 12c in which the plate 14 is fitted and that is formed on the upper end of the wall portion 12b. Therefore, the substrate 13 and the plate 14 are stably fixed to the cover 12, and also the input unit 65 is stably arranged on the substrate 13.

According to the present embodiment, the operation device 100 further includes the wireless communication module 16 that performs wireless communication with the wireless communication module 26. Thereby, the communication between the wireless communication modules 16 and 26 can be performed.

According to the present embodiment, the operation device 100 includes the control device 74 that stores information in which the address of the wireless communication module 26 and the type of the input unit 65 equipped with the wireless communication module 26 are associated with each other. Thereby, it is possible to identify the input unit 65 by using the information and to perform the communication between the wireless communication modules 16 and 26.

According to the present embodiment, the input unit 65 includes the terminal 28 that contacts the plate 14 and supplies the ground potential to the input unit 65. The input unit 65 acquires the power source from the substrate 13 and acquires the ground potential from the plate 14, so that the input unit 65 may be arranged everywhere on the substrate 13. Thereby, the degree of freedom of the arrangement is increased.

According to the present embodiment, the input unit 65 includes the LED 29. The user can confirm existence or nonexistence of the operation of the input unit 65 and/or the operation content of the input unit 65 by the light of the LED 29.

According to the present embodiment, each of the plates 14 and 17 includes opening portions (i.e., holes 14a to 14c and the slit 14d) for exposing the member to be operated above the corresponding plate. Thereby, the user can change the arrangement of the input unit 65 according to user's preference by using one of the plates having different arrangements of the opening portions. Moreover, the input unit 65 is inserted into any one of the opening portions, and hence the position of the input unit 65 is fixed until the plate is removed from the main body 10.

Although the spring 24 is used as a terminal supplying a supply voltage in the present embodiment, the terminal does not need to have a spring function.

In the present embodiment, the plate 14 includes the conductor layer 14e that contacts the terminal 28 or is made of a conductor. Thereby, the ground potential can be supplied to the input unit 65.

In the present embodiment, the input unit 65 is the switch unit 20 or 40, the rotary encoder unit 50, or the slide resistor unit 60, but the input unit 65 may be a joystick, a touch panel or the like, for example. The member to be operated of the input unit 65 needs to be mounted on the upper surface of the substrate 30 and the spring 24 needs to be mounted on the lower surface of the substrate 30.

In the present embodiment, the input unit 65 may be one or more. Even when the number of input units 65 is one, it is possible to change the arrangement of the input unit 65 on the substrate 13 without limitation.

Here, the operation device 100 may include a plurality of wireless communication modules 16. In this case, each input unit 65 can be assigned to each wireless communication module 16 like a case where a part of the input units 65 communicates with the single wireless communication module 16 and another part of the input units 65 communicates with another wireless communication module 16.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An operation device comprising:
a first substrate on which a wiring pattern is formed;
an input unit that is operably mountable at a plurality of different positions on the first substrate, and includes a member to be operated, a first wireless communication module that outputs a signal in accordance with operation of the member to be operated, and a first terminal that contacts the wiring pattern and supplies a power source to the first wireless communication module; and
a position defining member that maintains the input unit at one of the plurality of positions on the first substrate.

2. The operation device as claimed in claim 1, wherein the input unit is provided between the first substrate and the position defining member.

3. The operation device as claimed in claim 1, comprising:
a cover including:
a bottom portion on which the first substrate is mounted;
a wall portion formed on an outer circumference of the bottom portion; and
a cutout portion in which the position defining member is fitted and that is formed on an upper end of the wall portion.

4. The operation device as claimed in claim 1, further comprising:
a second wireless communication module that performs wireless communication with the first wireless communication module.

5. The operation device as claimed in claim 1, comprising:
a control device that stores information in which an address of the first wireless communication module and a type of the input unit equipped with the first wireless communication module are associated with each other.

6. The operation device as claimed in claim 1, wherein the input unit includes a second terminal that contacts the position defining member and supplies a ground potential to the input unit.

7. The operation device as claimed in claim 1, wherein the input unit includes a lighting member.

8. The operation device as claimed in claim 1, wherein the position defining member includes an opening portion for exposing the member to be operated above the position defining member.

9. An operation device comprising:
a first substrate on which a wiring pattern is formed;
an input unit that is mountable on the first substrate, and includes:
a member to be operated;
a first wireless communication module that outputs a signal in accordance with operation of the member to be operated; and
a first terminal that contacts the wiring pattern and supplies a power source to the first wireless communication module; and
a second wireless communication module mounted on the first substrate,
wherein the first wireless communication module performs wireless communication with the second wireless communication module, and transmits a signal corresponding to an operation of the input unit to the second wireless communication module.

* * * * *